United States Patent Office 3,836,561
Patented Sept. 17, 1974

3,836,561
METHOD OF TREATING ALUMINA
CONTAINING OXIDES
Dean Arthur Young, Yorba Linda, Calif., assignor to
Union Oil Company of California, Los Angeles, Calif.
No Drawing. Continuation-in-part of application Ser. No.
191,057, Oct. 20, 1971, which is a continuation-in-part
of application Ser. No. 15,219, Feb. 27, 1970, now
Patent No. 3,691,099, which is a continuation-in-part
of application Ser. No. 797,678, Feb. 7, 1969, now
abandoned, which is a continuation-in-part of application Ser. No. 697,587, Jan. 15, 1968, now Patent No.
3,460,934, which in turn is a continuation-in-part of
application Ser. No. 457,485, May 20, 1965, now Patent
No. 3,383,169. This application Aug. 16, 1972, Ser.
No. 281,025
Int. Cl. B01j 11/32, 11/40
U.S. Cl. 252—450         6 Claims

ABSTRACT OF THE DISCLOSURE

Particle form alumina-containing amorphous oxides or combinations thereof with crystalline zeolites are acid treated to increase porosity and permeability, decrease bulk volume or improve one or more characteristics of the zeolite without substantial loss of structural strength at a pH below about 5 sufficient to react at least a portion of the alumina in the amorphous oxide in the presence of an ionizable water soluble salt.

---

This application is a continuation-in-part of my copending application Ser. No. 191,057, filed Oct. 20, 1971; a continuation-in-part of Ser. No. 15,219, filed Feb. 27, 1970, now U.S. Pat. 3,691,099; in turn a continuation-in-part of Ser. No. 797,678, filed Feb. 7, 1969, now abandoned; itself a continuation-in-part of Ser. No. 697,587, filed Jan. 15, 1968, now U.S. Pat. 3,460,934, which was a continuation-in-part of Ser. No. 457,485, filed May 20, 1965, now U.S. Pat. 3,383,169.

Alumina containing amorphous oxides are widely used in the chemical and petroleum industries as adsorbents, binders and catalyst supports. Several of the properties of these materials can be improved by acid treatment. The alumina reacted with the acid is usually dissolved in the acid phase. This procedure is known to increase porosity and permeability and lower bulk density. Surface area may also be increased. However, these advantages are usually obtained at the expense of some other desirable property such as structural or crushing strength.

Thus, it is one object of this invention to reduce the loss of structural strength during acid treatment of alumina-containing amorphous refractory oxides. Another object is the provision of a method for increasing the porosity of alumina-containing refractory oxides without excessive loss of physical strength. Yet another object is the provision of a method for acid treating aluminas or combinations of alumina with other amorphous refractory oxides or crystalline aluminosilicates while minimizing the loss in structural stability of those combinations.

In accordance with one embodiment of this invention an alumina-containing amorphous refractory oxide is reacted with an acid in an aqueous medium at a pH below about 5 in the presence of an ionizable salt soluble in the aqueous phase under conditions of temperature, pH and reaction time correlated with the reactivity of the acid and the oxide sufficient to react a portion of the alumina with the acid. A major portion of the reacted alumina is usually dissolved in the acid phase and is thereby removed from the amorphous oxide. This generally results in a reduction in bulk density and an increase in porosity and permeability.

The amorphous oxide should contain sufficient alumina to assure that a significant variation in physical properties will result from this treatment. Thus the alumina content should exceed about 5 weight percent and is usually above 30 percent of the amorphous oxide. For example, in the case of alumina bound zeolite aggregates, the amorphous portion of the aggregate may consist completely of alumina. Otherwise the alumina can be combined with one or more amorphous oxides such as silica, magnesia, beryllia, titania, zirconia, chromia, and the like. These materials can be added either as synthetically produced products or as naturally occurring minerals and clays such as bentonite, montmorillonite, and the like. These clays may be used either in their natural form or may be chemically treated by acid extraction or the like, prior to formation into the desired particle. Similarly, when the particle comprises two or more refractory oxides, that combination can be formed either by physical admixture, coprecipitation or sequential gelation of one or more of the oxides. For example, an alkali or alkaline earth metal aluminate can be acidified and gelled in the presence of a finely powdered form of montmorillonite or a preformed silica gel. Similarly, silica and alumina or other components could be gelled simultaneously from precursors such as the basic alkali metal silicates, aluminates and the like.

The amorphous refractory oxides can also be combined with crystalline materials, notably the crystalline aluminosilicates. Such combinations are often employed as adsorbents, ion exchange agents, catalysts or catalyst supports. These combinations will usually contain at least about 2 weight percent of the crystalline zeolite on a dry weight basis. However, most compositions contain between about 5 and about 90 weight percent of the crystalline material.

Essentially any synthetic or naturally occurring crystalline zeolites can be combined with the amorphous oxides. Illustrative of the synthetic zeolites are Zeolite X, U.S. 2,882,244, Zeolite Y, U.S. 3,130,007, Zeolite A, U.S. 2,882,243, Zeolite L, Bel. 575,117, Zeolite D, Can. 611,-981, Zeolite R, U.S. 3,030,181, Zeolite S, U.S. 3,054,657, Zeolite T, U.S. 2,950,952, Zeolite Z, Can. 614,995, Zeolite E, Can. 636,931, Zeolite F, U.S. 2,995,358, Zeolite O, U.S. 3,140,252, Zeolite B, U.S. 3,008,803, Zeolite Q, U.S. 2,991,151, Zeolite M, U.S. 2,995,423, Zeolite H, U.S. 3,-010,789, Zeolite J, U.S. 3,011,369, Zeolite W, U.S. 3,012,-853, Zeolite KG, U.S. 3,056,654, and Omega, Can. 817,-915. Illustrative of the naturally occurring crystalline aluminosilicates are levynite, dachiardite, erionite, faujasite, analcite, mordenite, chabazite and the like. Zeolites presently preferred due to their chemical, physical and catalytic properties are the large pore zeolites in which a predominance of the pore volume is constituted by pores having diameters in excess of about 4 angstroms, usually between about 4 and about 16 angstroms. Among these, the most preferred are the natural and synthetic zeolites having structures similar to faujasite, such as synthetic faujasites X and Y, and zeolites A, L, T, Omega and the like. The term "synthetic faujasites" encompasses all forms of these materials having a characteristic faujasite structure including the various treated forms such as the ultrastable faujasite of U.S. 3,293,192.

Many of the crystalline aluminosilicates are not stable to acid attack. That factor in itself is not critical to the essence of this invention. However, it is often desirable to use acid stable zeolites so that the treated composition will contain at least a substantial amount of crystalline zeolite. Illustrative stable zeolites are the synthetic faujasites of U.S. 3,293,192, steam-stabilized hydrogen or deactionized Y zeolite, mordenite and the like.

Of course, essentially every zeolite has some stability to acid attack. Thus the degree of crystallinity loss during acid treatment will depend upon the severity of that treatment. Accordingly, the acid strength or pH, reaction temperature and time should be correlated with the acid tolerance of the aluminosilicate and, for that matter, the tolerance of the amorphous oxide, to preserve the desired physical structure. Conversely, these conditions should be sufficiently severe to react at least 5 relative percent of the alumina present in the amorphous oxide so that a significant variation in physical properties will result from this treatment.

The acidity of the aqueous medium should correspond to a pH of less than about 5, usually less than about 4 and preferably below about 3. The degree of reaction at any given set of conditions will, of course, depend upon the acid concentration. Thus, a greater degree of alumina abstraction will result at the lower pH levels. However, as already observed, excessive acid reaction can diminish desirable properties of the amorphous oxides such as crushing strength. Thus the selection of pH, acid type, reaction temperature, and duration of contacting depends upon the stability of the amorphous oxide, or other constituents and the degree of alumina abstraction desired. The optimum values of these variables can be readily determined. These evaluations can be accomplished empirically by exposing several portions of the the refractory oxide or aggregate to acidic media of differing pH. For an example, the oxide may be reacted with aqueous HCl at pH 3.4, 3.0 and 2.6, at several different temperatures, reaction times, temperatures and salt concentrations. Each of the products can then be collected, washed, and analyzed to evaluate physical properties such as porosity, permeability, bulk density and crushing strength. These results will then enable the determination of the optimum conditions for treating that particular oxide or combination of oxides.

Essentially any acid which can react with alumina can be employed in these methods. Exemplary of these are the strong mineral acids such as hydrochloric, sulfuric, orthophosphoric and nitric acids, and organic mono- and polycarboxylic acids such as formic, acetic, citric, oxalic, tartaric, succinic, molonic, nitriloacetic and the like.

The salts employed in these procedures should be ionizable, water-soluble salts having substantial degrees of solubility in the acidic medium. In addition, when the refractory oxides are combined with crystalline aluminosilicates, it is often desirable that the cation of the salt be exchangeable with the cations of the aluminosilicate. It is presently believed that this characteristic of the salt solution results in substantially improved tolerance of the aluminosilicates to acid attack. Illustrative of suitable salt cations are metal cations and ammonium, primary, secondary, and tertiary amine ions having up to about 8 carbon atoms per molecule. The metal cations are usually chosen from Periodic Groups I, II, III–B, VI–B and VIII, including the lanthanide and actinide metals. Cations presently preferred due to their readily availability and suitability for use in these processes include amonium, and the alkali and alkaline earth metals. Illustrative salt anions include the halides, particularly chloride, nitrate, sulfate, phosphate, acetate, oxalate, tartrate, succinate ions and the like.

The salts can either be added directly as such or may be formed in situ by partial or complete neutralization of an acid having the desired anion with a base having the selected cation. It is presently believed that any substantial salt concentration results in some improvement whether the amount of salt present is only miniscule or the solution is supersaturated. However, it is presently preferred that the salt concentration be at least about 0.3 molar, or that it correspond to at least about 30 percent of the equivalent acid concentration. Concentrations of at least about 5 weight percent are usually employed although better results are obtained at higher concentrations, e.g., on the order of 50 percent saturation or more.

The refractory oxides should be mixed with sufficient aqueous medium to provide a relatively fluid slurry upon agitation so that homogeneity and adequate contacting can be realized. As a general rule at least about 2 volumes of solution should be employed for each volume of oxide. As already mentioned, reaction times should be determined in relation to the strength of the acid solution, the tolerance of the refractory oxide to acid attack and the degree of change desired. If the oxide is relatively sensitive to acid attack, minor changes in physical properties can be obtained with only very short contact times. Thus, essentially any reaction time can be employed that will obtain the desired changes of physical properties. However, as a general rule, reaction times in excess of about one-half hour are preferred. Similar considerations are involved in the selection of reaction temperatures. However, these temperatures will usually be in the range of about 30 to about 220° F. Higher temperatures can be employed if adequate means are provided for maintaining an adequate pressure on the aqueous phase.

The refractory oxides or aggregates can have any desired shape. These shapes can vary from regular or irregular forms of substantial mass to small particles such as extrudates, pellets, crushed gel particles or cast forms such as corrugated cylinders, plates and the like.

The following examples illustrate the manner in which these methods can be employed to improve the properties of alumina-containing amorphous refractory oxides.

EXAMPLES 1–3

Ammonium zeolite Y containing 1.1 weight percent $Na_2O$ and having a silica-to-alumina ratio of 4.27 was combined with sufficient boehmite alumina to provide 20 percent alumina on a dry weight basis and formed into 1/16 inch extrudates. Prior to combination with the zeolite, the alumina was peptized with 0.15 equivalents of nitric acid per mole of alumina. The extrudates were then dried at 220° F. and steamed for 90 minutes at 1260 to 1330° F. in the presence of 15 p.s.i. steam.

The steamed extrudates were divided into three portions. Each portion was exchanged twice with the solutions described in the following table. Five milliliters of solution was used per gram of extrudate for each exchange. During the first exchange, the slurries were digested for 48 hours at 70° F. During the second exchange, the extrudates were digested in the indicated solutions for 2 hours at 200° F. The products were then washed, dried and calcined at 1000° F. for 1 hour. The relative crystallinity of each product was determined by X-ray diffraction and comparison of the resulting spectra to the spectra of the ammonium zeolite prior to calcination. The acidity of each product was determined by Hammet acidity using calcone indicator and visual inspection of the color intensity. The crushing strength of each extrudate was determined as the average force required to crush a piece of the extrudate laid across a 1/8 inch flat bar. In each instance, the crushing strength represents an average of 25 determinations.

| Example number | 1 | 2 | 3 |
|---|---|---|---|
| Salt type | $(NH_4)_2SO_4$ | $(NH_4)_2SO_4$ | |
| Salt concentration | 3.0N | 3.0N | |
| Acid type | | $H_2SO_4$ | $H_2SO_4$ |
| Acid concentration | | 1.0N | 1.0N |
| Equilibrium pH: | | | |
|   First extraction | 5.0 | 4.4 | 3.4 |
|   Second extraction | 4.3 | 2.1 | 2.2 |
| Product: | | | |
|   Relative crystallinity, percent | 59 | 58 | 35 |
|   Acidity | Strong | Strong | Moderate |
|   Density, He displacement, g./ml | 3.31 | 2.60 | 2.52 |
|   Density, Hg displacement, g./ml | 0.865 | 0.695 | 0.711 |
|   Porosity, ml./g | 0.853 | 1.05 | 1.01 |
|   Crush strength, lb | 13.5 | 12.7 | 9.0 |

Example 2 illustrates one embodiment of this invention. Comparison of this example to Examples 1 and 3 employing only salt or acid respectively, demonstrates the superiority of this procedure. The extrudates of Example 2 exhibited an average crushing strength of 12.7 lbs. as compared to 13.5 lbs. in Example 1. This represents a loss in crushing strength of approximately 6 percent. However, the composition of Example 3 treated with the same acid concentration exhibited a crushing strength of only 9.0 pounds. This represented a loss of more than 33 percent as compared to Example 1. Nevertheless, several desirable properties were improved in Example 2 to an extent equal to or greater than that observed in Example 3. The bulk density in Example 2 was 0.695 as compared to 0.711 grams per milliliter in Example 3. This represents a greater reduction in bulk density. This reduction is equivalent to a greater increase in porosity which is further verified by the porosity values of 1.05 for Example 2 and 1.01 for Example 3. Thus it is apparent that these methods markedly improve certain properties while minimizing the loss of other desirable characteristics.

I claim:

1. The method of acid treating a particle form amorphous refractory oxide comprising at least 5 weight percent alumina and increasing the porosity and reducing the density of said oxide including the steps of reacting said oxide with an acid selected from the group consisting of sulfuric, hydrochloric and nitric acids at a pH below about 5 in an aqueous medium containing a water soluble ionizable salt having a cation selected from the group consisting of ammonium, primary, secondary and tertiary amines having up to 8 carbon atoms and the metals of Periodic Groups I, II and III–B including the lanthanide and actinide series under conditions of temperature, pH and reaction time correlated with the reactivity of said oxide and said acid sufficient to react at least about 5 percent of said alumina with said acid and increase the porosity and reduce the density of said oxide.

2. The method of claim 1 wherein said oxide is reacted with said acid at a pH below about 4, the concentration of said ionizable salt in said solution is at least about 0.3 molar, and the anion of said salt is selected from chloride, nitrate, sulfate, phosphate, acetate, citrate, oxalate, tartrate, formate, malinate nitriloacetate and succinate anions.

3. The method of claim 2 wherein said refractory oxide comprises at least about 30 weight percent alumina and is intimately associated with at least about 2 weight percent of a crystalline aluminosilicate zeolite in a particle-form aggregate and said salt comprises a cation selected from ammonium and the alkali and alkaline earth metal ions.

4. The method of claim 2 wherein said oxide comprises at least about 30 weight percent alumina, said oxide is in intimate association with at least one acid stable crystalline aluminosilicate zeolite, and the combination of said oxide and said zeolite is reacted with said acid under conditions sufficient to react at least 5 relative percent of the alumina in said oxide with said acid and decrease the bulk density of said combination while substantially maintaining the structural stability of said combination.

5. The method of claim 3 wherein said zeolite is selected from acid stable faujasite-type zeolites and zeolites A, L, T and Omega.

6. The method of claim 1 wherein said salt is present in a concentration corresponding to at least about 50 percent saturation of said solution and comprises a cation selected from the group consisting of ammonium and the alkali and alkaline earth metal ions, said alumina constitutes at least 30 weight percent of said oxide, and said acid is reacted with said oxide at a pH below about 4.

References Cited
UNITED STATES PATENTS

| | | | |
|---|---|---|---|
| 3,706,693 | 12/1972 | Mickelson et al. | 252—455 Z |
| 3,557,024 | 1/1971 | Young | 252—455 Z |
| 3,442,794 | 5/1969 | Van Helden et al. | 252—455 Z |
| 3,340,011 | 9/1967 | Hoekstra et al. | 252—463 X |

CARL F. DEES, Primary Examiner

U.S. Cl. X.R.

252—455 Z, 463